United States Patent [19]
Mincuzzi

[11] 4,006,402
[45] Feb. 1, 1977

[54] DEVICE FOR REMOTE TRANSMITTING PRESSURE SIGNALS

[75] Inventor: Antonio Mincuzzi, Milan, Italy

[73] Assignee: Societe Internationale de Mecanique Industrielle, S.A., Luxembourg

[22] Filed: May 21, 1975

[21] Appl. No.: 579,428

[30] Foreign Application Priority Data

May 22, 1974 Italy ................................ 23067/74

[52] U.S. Cl. ........................ 323/94 H; 73/398 AR; 338/32 R; 338/195
[51] Int. Cl.² ..................... G01L 9/00; H01L 43/08
[58] Field of Search ..... 73/398 R, 398 AR, DIG. 3; 307/309; 323/94 H, 94 R; 338/32 R, 32 H, 195

[56] References Cited
UNITED STATES PATENTS

| 3,575,054 | 4/1971 | Glista | 73/DIG. 3 |
| 3,761,958 | 9/1973 | Nishira | 73/398 AR |
| 3,848,216 | 11/1974 | Gamble | 323/94 H |
| 3,848,252 | 11/1974 | Chang et al. | 323/94 H |

OTHER PUBLICATIONS
Bross et al, "Modular Resistor Array," IBM Technical Disclosure Bulletin, Oct. 1970, vol. 13, No. 5, pp. 1105, 338-195.

*Primary Examiner*—A. D. Pellinen
*Attorney, Agent, or Firm*—Stevens, Davis, Miller & Mosher

[57] ABSTRACT

Device for remote transmitting pressure signals, of the type comprising a chamber delimited by a pressure-sensitive flexible membrane and in communication with the fluid, the pressure of which has to be measured, a mechanical-electrical transducer in the form of a magnetoresistor immersed in a magnetic field, the flux of which varies in relation to the membrane movement, a ferromagnetic core mounted in an axially adjustable position on a support rod which is axially slidable and controlled directly by the movements of the flexible membrane, and at least one magnetoresistor arranged near the path of the core and immersed in a permanent magnetic field, the flux of which is influenced by the moving ferromagnetic core.

14 Claims, 4 Drawing Figures

DEVICE FOR REMOTE TRANSMITTING PRESSURE SIGNALS

BACKGROUND OF THE INVENTION

1. Field of the Invention

This invention relates to a device for remote transmitting a signal which varies in relation to a pressure to be measured.

Instruments of this type are widely known and used in many fields, for example for remote indicating the oil pressure in the lubricating circuit of motor vehicle engines.

2. Description of the Prior Art

In this specific field, to which the invention refers, — though not being strictly limited thereto — devices are generally used at present, which may conventionally be defined as of "rheostatic" type.

Generally, in these devices, the deformation produced in an elastic membrane by the fluid pressure to be measured, is transformed into a movement of the slider of a rheostat, connected to an electric control circuit, so as to determine a relationship between pressure values and the rheostat resistance. The resistance variation is used in the electric circuit to modulate an electric current which is indicated on a suitable instrument.

A "rheostatic" device of the type heretofore described is illustrated for example in the Italian Pat. No. 927.642 in the name of the same applicant, and it is therefore considered unnecessary to describe its operation in greater detail.

Although rheostatic devices work, on the whole, in a satisfactory way, they show however some inconveniences — particularly with regard to their indication accuracy and life — if they are subjected to very high vibrational stresses, as often occurs when they are mounted on motor vehicles.

This derives mainly from the fact that the movement of the central point of the pressure-sensitive elastic membrane has to be amplified by more or less complicated mechanical systems, before being applied to the rheostat slider, so as to obtain a sufficiently wide stroke of the actual slider.

If subjected to high vibrations, these mechanical amplifying systems may however give rise to inconveniences such as an increase in the operating clearance between the various members, miscalibration, wear of the moving parts or even breakage.

SUMMARY OF THE INVENTION

All these drawbacks are eliminated by the device according to the present invention which, on the one hand, comprises characteristics of mechanical strength and constructional simplicity, which make it particularly suitable for use on motor vehicles — where mechanical and thermal stresses are particularly serious — and, on the other hand, offers accurate operation with the possibility of perfect calibration and adjustment.

In particular, the device according to the present invention uses — for transforming the movement of the pressure-sensitive elastic membrane into a variable electric signal — the operating characteristics of semiconductors sensitive to magnetic field variations, commonly called "magnetoresistors".

These magnetoresistors have been known for many years and are at present manufactured and sold by the German firm SIEMENS. Their fundamental characteristic lies in the fact that, when subjected to a variable magnetic field, their electrical resistance changes.

These magnetoresistors are proposed by SIEMENS for use in the most diverse fields, but in particular in the field of pressure transducers, the suggestion being made that the movement of the pressure-sensitive flexible membrane be transformed into a relative movement between a permanent magnet and one or more magnetoresistors, with consequent variation of the magnetic flux in which the magnetoresistors are immersed, leading to variation in the value of their electrical resistance.

The object of the present invention is to provide a pressure indicating device which comprises a pressure-sensitive elastic membrane and which uses, as its mechanical-electrical transducer, at least one magnetoresistor immersed in a magnetic field, the flux of which varies in relation to the movements of said membrane, said device representing an improvement over the known art by virtue of its stronger structure of simple construction, and its possibility of precise calibration. This device is actually characterized by the fact that, in association with said flexible elastic membrane sensitive to pressure variations, it comprises a ferromagnetic body or core mounted, so that its position is axially adjustable, on a support rod directly controlled by the flexible membrane, and at least one magnetoresistor, arranged near the travel path of said core and immersed in a permanent magnetic field, the flux of which is influenced by the moving ferromagnetic core.

BRIEF DESCRIPTION OF THE DRAWINGS

Further characteristics and advantages of the present invention will be more evident from the description given hereinafter with reference to the accompanying drawings, in which.

DESCRIPTION OF THE PREFERRED EMBODIMENT

Figure 1:
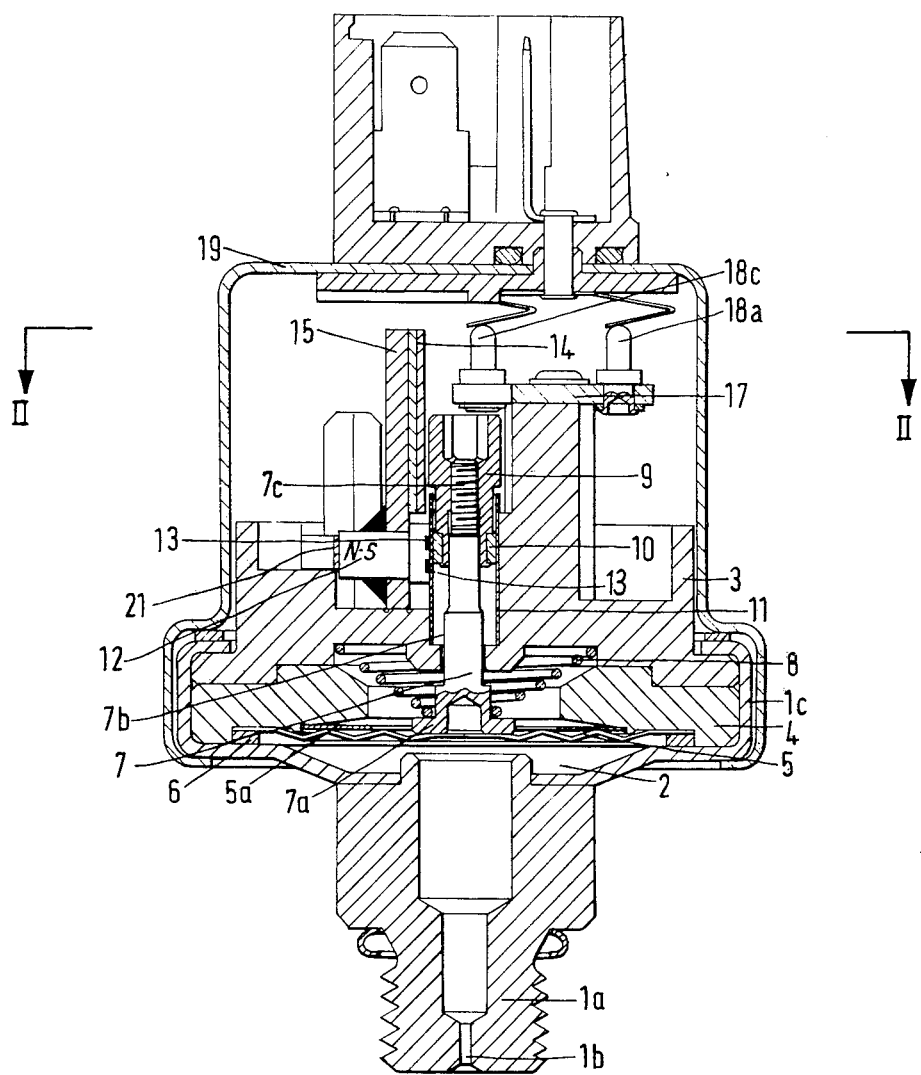
FIG. 1 is an axial section through a pressure measuring device according to the invention.

As can be seen, the lower body of the pressure measuring device comprises at one end a connector 1a, for example in the form of a threaded stem, provided with an axial bore 1b through which the fluid under pressure reaches the chamber 2, and at the other end a head 1c flanged over on to the support base 3, which keeps the disc 4 and pressure-sensitive elastic membrane 5 in position.

The chamber 2 is fluid tight because of the gasket 6 located between the periphery of the membrane 5 and the head 1c, so that the variations of fluid pressure in the chamber 2 are transformed into movements of the membrane 5, in the manner described for example in the aforementioned Italian Pat. No. 927.642. A membrane backing plate 5a, through which the lower end of the rod 7 for detecting the membrane movements freely passes, is positioned freely centered between the membrane 5 and lower recessed surface of the disc 4.

The rod 7 bears on the central part of the membrane 5 with its base, in the form of a widened flange 7a, and extends upwards, along the axis of the device, into a portion 7b, which traverses the disc 4 and base 3, and into a subsequent terminal portion 7c, which is thinner and threaded.

The rod 7 is kept in contact with the membrane 5 by the action of the tapered spring 8, which bears at one end against a shoulder of the lower surface of the base 3 and at the other end against said flange 7a of the rod 7.

In the zone in which the portion 7b of the rod 7 traverses the base 3, its cross section, and likewise the cross section of the passage formed in the base 3, are not circular but are for example polygonal. In this manner any possibility of rotation of the rod 7 is avoided, while its movement in the axial direction is allowed.

On the threaded portion 7c of the rod 7 is screwed a nut 9 of non-magnetic material, the shape of which is adapted to support a ferromagnetic core 10 of hollow cylindrical form. The core 10 is fixed on the nut in any suitable manner, for example by turning over the end part of the nut 9 as shown.

In this manner, the ferromagnetic core 10 is made integral with the nut 9 and consequently with the rod 7, of which it follows the movements in the axial direction. A thin walled cylinder 11 of non-magnetic material serves for guiding the axial movements of the core 10.

The cylinder 11 is fixed to the base 3 by any suitable means, for example by an adhesive sealing resin.

A permanent magnet 12 is rigidly fixed on the base 3 immediately external to the cylinder 11, in such a position that the N-S axis of its magnetic field is perpendicular to the sliding axis of the ferromagnetic core 10.

Two semiconductor elements 13 or magnetoresistors, sensitive to the magnetic field of the magnet 12, are applied or embedded, and fixed by known means, on the polar surface of the magnet 12 to the side of the cylinder 11.

The magnetoresistors 13 are fixed on the magnet 12, so as to result symmetrically arranged with respect to the axis of the magnetic field produced by the magnet 12, and they are further aligned parallel to the sliding axis of the core 10.

The magnet 12 is positioned against the cylinder 11 with the aid of a preloaded spring 21, which is subsequently made neutral by a sealing material.

The magnetoresistors 13 are connected by conductors 13a (see FIG. 4) to an electronic amplifying circuit 14, constructed for example using the thick-film technique. The circuit 14 is rigidly connected to a support plate 15 fixed to the base 3 by any known means, for example by an adhesive sealing resin.

Preferably the magnet 12, the magnetoresistors 13 and the connections 13a, are premounted and fixed on the support plate 15, so that the unit comprising the magnet 12, the magnetoresistors 13, the circuit 14 and the support plate 15, forms a rigid prefabricated whole, which may be easily mounted on the base 3 as a separate unit.

Figure 4:
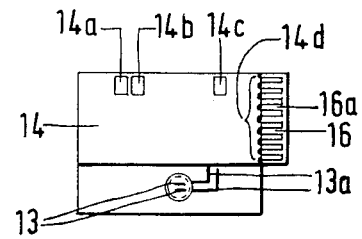
FIG. 4 is a diagrammatic elevation of the support for the electrical control and indication circuit.
Figure 3:
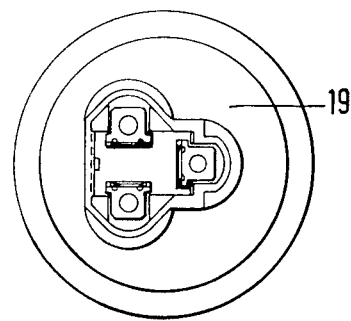
FIG. 3 is a view from above of the said device.

Besides the magnetoresistors 13, the connecting conductors 13a and the circuit terminals 14a, 14b and 14c, the electronic circuit 14 illustrated diagrammatically in FIG. 4 also shows a comb structure 16, associated with a series of ohmic resistors, the terminals of which are diagrammatically indicated at 14d. The resistors are shortcircuited by the comb 16, which is formed from a good electrically conducting material, and in particular by its teeth which are welded to the terminals of said resistors. As shown in FIG. 4, the comb 16 projects laterally from the circuit plate 14.

Figure 2:
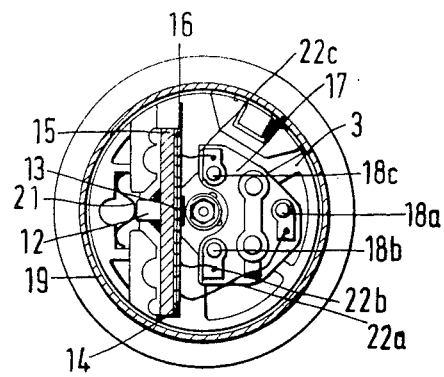
FIG. 2 is a horizontal section on the line II—II of FIG. 1.

A plate 17 is fixed on the highest part of the base 3 and carries contacts 18a, 18b and 18c to which the terminals 14a, 14b and 14c are connected by conductors 22a, 22b, 22c (see FIG. 2). The contacts 18 are in turn connected to the outside of the casing 19 of the device, by known means.

The operation of the device heretofore described is evident.

The fluid which enters the chamber 2 through the bore 1b produces a deformation of the membrane 5 to an extent proportional to the fluid pressure.

The movements of the membrane 5, according to the pressure variations, give rise to corresponding movements of the rod 7 and hence also of the ferromagnetic core 10, inside the cylinder 11 of non-magnetic material, so causing a variation in the density of the lines of flux of the magnetic field generated by the permanent magnet 12.

The two magnetoresistors 13, which are bridge connected in the circuit 14, react to this variation in the density distribution of the lines of flux, thus causing a variation in the electrical conditions of the circuit 14 which, after suitable amplification, are measured by the indicating instrument.

In devices of the type heretofore described, and generally in any transducer device, the response characteristics, — which are represented by a "response curve", i.e. a curve of output against input — are known to be influenced by the actual characteristics of the device components. This is especially true in the case of mass production, where the dimensional and operational characteristics of the components show a fairly wide spread of values.

For this reason it is absolutely necessary to calibrate the device. From the description given heretofore, it is evidently possible to carry out this calibration simply and practically, and this is also the fundamental characteristic of the invention.

A first calibration implies the zero-point adjustment of the response curve of the device, which consists of displacing the curve to a position such that, to a predetermined value of the input signal, i.e. a predetermined fluid pressure, may correspond a given value of the output signal. This is obtained by adjusting the axial position of the ferromagnetic core 10 with respect to the axis of the magnetic field of the magnet 12, which may be done by simply screwing the nut 9 on the threaded part 7c of the rod 7 to the required extent.

A second calibration implies adjusting the slope of the said response curve of the device, which consists of rotating the response curve about its zero point so that to a predetermined input signal amplitude, i.e. a predetermined fluid pressure variation, may correspond a given output signal amplitude. This is obtained by connecting a resistor of greater or lesser value across the outlet of the electronic circuit 14, which may be done by removing some teeth of the comb 16. In this manner the resistors which were short circuited by such teeth now become connected in series, so as to form together the necessary total resistance to be plugged into the circuit, and consequently the required slope.

The invention is not limited to the particular embodiment heretofore described, but various modifications may be made to it, all within the range of the expert of the art, without leaving the scope of the invention itself.

I claim:

1. In a device for remote transmitting pressure signals, of the type comprising a chamber delimited by a pressure-sensitive flexible membrane and in communication with the fluid, the pressure of which has to be measured, and a mechanical-electrical transducer in the form of a magneto-resistor immersed in a magnetic field, the flux of which varies in relation to the membrane movement, the improvement comprising in that a ferromagnetic core is mounted in an axially adjustable position on a support rod threaded on one end thereof which is axially slidable and controlled directly by the movements of said flexible membrane, a nut of non-magnetic material, screwed on to the threaded end of said support rod, said ferromagnetic core being in the form of a ring and integral with said nut, and in that at least one magnetoresistor is arranged near the travel path of said core and is immersed in a permanent magnetic field, the flux of which is influenced by the moving ferromagnetic core.

2. Device as claimed in claim 1, including a tubular guide of non-magnetic material and wherein said ferromagnetic core and its relative support rod are axially slidable in said tubular guide of non-magnetic material.

3. Device as claimed in claim 1, including a pair of magnetoresistors aligned parallel to the axis along which said ferromagnetic core slides.

4. Device as claimed in claim 3, including a permanent magnet having a pole face and wherein said magnetoresistors are fixed on a pole face of said permanent magnet, arranged near the path along which said ferromagnetic core slides.

5. Device as claimed in claim 4, including a tubular guide of non-magnetic material into which axially slides the ferromagnetic core and its support rod and wherein the pole face of the permanent magnet which carries the magnetoresistors is applied against the outer surface of said tubular guide for the ferromagnetic core.

6. Device as claimed in claim 3, including an electronic amplifying circuit comprising means for adjusting the amplitude of the output signal, said magnetoresistors being connected thereto.

7. Device as claimed in claim 6, wherein said magnetoresistors are bridge mounted in said electronic amplifying circuit.

8. Device as claimed in claim 6, including a rigid support plate and wherein said electronic circuit, constructed by the known thick-film technique, is mounted on said rigid support plate on which are also mounted said permanent magnet and the relative magnetoresistors, so as to form a prefabricated unit.

9. Device as claimed in claim 6, wherein said means for adjusting the amplitude of the electronic circuit output signal consist of a plurality of resistors, said resistors being at least partly short circuited.

10. Device as claimed in claim 9, wherein said resistors are short circuited by a metal comb, the teeth of which are welded to the resistor terminals.

11. Device as claimed in claim 10, wherein said metal comb covers the entire set of resistors, one or more of its teeth being broken off to interrupt the short circuiting of the corresponding resistors.

12. Device as claimed in claim 1, wherein said permanent magnetic field is perpendicular to the axis of sliding of said ferromagnetic core.

13. Device as claimed in claim 1, wherein said support rod for the ferromagnetic core bears on the center of the pressure-sensitive flexible membrane.

14. Device as claimed in claim 13, including a tapered pressure ring and wherein said support rod is held against said flexible membrane by the action of said tapered pressure spring.

* * * * *